United States Patent [19]

Mathis

[11] Patent Number: 4,650,206
[45] Date of Patent: Mar. 17, 1987

[54] LOCKING HITCH ASSEMBLY

[76] Inventor: Leon H. Mathis, 103 Hiwassee Dr., P.O. Box 1277, Starkville, Miss. 39759

[21] Appl. No.: 681,259

[22] Filed: Dec. 13, 1984

[51] Int. Cl.⁴ .......................... B60D 1/00; B60D 1/10
[52] U.S. Cl. ................... 280/456 A; 56/15.8; 172/477; 172/450; 172/457; 280/460 A; 280/474; 280/492
[58] Field of Search ............... 280/492, 490 R, 490 A, 280/491 E, 456 A, 460 R, 461 R, 446 B, 452, 453, 474; 172/457, 466, 450, 677, 477, 478; 56/228, 15.7, 15.8; 403/354

[56] References Cited

U.S. PATENT DOCUMENTS

| 709,601 | 9/1902 | Horner | 172/149 |
|---|---|---|---|
| 1,491,168 | 4/1924 | Prendergast | 72/479 |
| 2,362,407 | 11/1944 | Ruddock | 172/466 |
| 2,582,538 | 1/1952 | Flynn | 172/477 |
| 2,611,304 | 9/1952 | Toland | 172/457 |
| 2,852,995 | 9/1958 | Domries | 172/90 |
| 2,990,632 | 7/1961 | Noblin | 172/539 |
| 3,047,076 | 7/1962 | Wier et al. | 172/450 |
| 3,107,736 | 10/1963 | Mellen | 172/457 |
| 3,223,177 | 12/1965 | Van Der Lely | 172/449 |
| 3,274,712 | 9/1966 | Jones | 172/197 |
| 3,486,566 | 12/1969 | Nja | 172/265 |
| 3,503,625 | 3/1970 | Muller | 172/450 |
| 3,510,970 | 5/1970 | Mikhailov et al. | 172/4 |
| 3,527,308 | 9/1970 | Bernotas et al. | 172/464 |
| 3,571,956 | 3/1971 | Heiberg | 172/477 |
| 3,586,111 | 6/1971 | Jackson | 172/149 |
| 3,731,750 | 5/1973 | Brazell | 172/457 |
| 4,015,667 | 4/1977 | Ruozi | 172/133 |
| 4,026,225 | 5/1977 | Vink | 172/146 |
| 4,074,766 | 2/1978 | Orthman | 172/466 |
| 4,316,511 | 2/1982 | Andersen | 172/466 |
| 4,318,445 | 3/1982 | Schuck | 280/456 A |

FOREIGN PATENT DOCUMENTS

2715112 10/1978 Fed. Rep. of Germany ... 280/456 A

Primary Examiner—John J. Love
Assistant Examiner—Everett G. Diederiks, Jr.
Attorney, Agent, or Firm—Cushman, Darby & Cushman

[57] ABSTRACT

The present invention relates to a simplified tractor hitch structure for use with implements and an improved plow attachment for use in developing firelines in forest soil. The hitch allows implements to be moved between a raised transport position and a lowered working position. In the former, however, a simplified approach is employed to provide locking and unlocking functions controlled by the tractor operator while seated in the tractor and to positively prohibit horizontal swaying of the hitch and thus the implement.

8 Claims, 9 Drawing Figures

LOCKING HITCH ASSEMBLY

FIELD OF THE INVENTION

This invention concerns an improved narrower fireline plow useful in helping fight forest fires by preparing firelines in narrow areas, such as tree forms, where smaller tractors must be used between the rows, and also to a hitch assembly for attaching that or plows or other implements to a tractor.

BACKGROUND OF THE PRESENT INVENTION

Over the years, many types of hitching assemblies have been developed for a variety of purposes. With each it is necessary that the implement or plow be towable and with some, the hitch will move the implement between a raised transport position where the implement is out of contact with the soil and a lowered working position. When in the raised transport position, it is most desirable that the implement or plow be as fixed or secure as possible with respect to the tractor to which the implement and hitch are attached to ease transportation and to minimize the potential of injury from swaying or movement of the implement through a horizontal arc. It is also desirable to control raising and lowering from the tractor operator's position on the tractor. On the other hand, when plowing it is most desirable that the plow be highly maneuverable behind the tractor so that regardless of the direction the tractor takes, the plow will follow.

Additionally, it is important for the plow to be kept in its plowing attitude while at the same time being able to successfully avoid impediments, obstacles or hazards in the earth that might otherwise damage the plow. While it is important to avoid such impediments, it is also desirable that the plow be returned to its plowing position once the obstacle has been passed by so that plowing can resume.

Thus, the primary objective of the hitch assembly is to provide a hitch useful with a wide variety of tractors and one that can be adapted to a variety of models or types of implements or plows, one that will allow attachment and hook up, as well as manufacture with the least amount of effort and cost. It is also desirable to provide the most amount of clearance between the lowest point of the plow and the ground when the plow is in its raised or transport position. It is also an important objective to provide an easily operable hitch, one that can be safely locked and unlocked, especially without requiring the operator to get off the tractor to perform either the locking or unlocking functions and a hitch that will positively prevent horizontal movement of the hitch and any attached implement when in its raised position.

With respect to the fireline plow, it is of course important, when fighting forest fires, to establish firelines having a several foot width from which all vegetation and burnable material has been removed. Being able to establish and maintain such lines rapidly greatly enhances the ability of those fighting a forest fire to retard and control the spread of such fires. It is also important to employ a fireline plow that is towable by a tractor, such as a crawler type tractor shown in this application, and one that can be easily maneuvered to follow the tractor along a winding course through the forest. With tree forms increasing in numbers, it has been desirable to have a narrow fire plow that can be pulled between rows of young trees, spaced closely together and one that can be pulled by small tractors. In order to establish a clean and thus establish a fireline in these new environments, it is important that the fireline plow develope a narrow fireline, be maintained in plowing contact with the ground, but, at the same time, avoid unplowable objects in the soil such as tree roots without damaging the plow. Following the avoidance of such obstacles, it is important that the plow be returned to its plowing position as rapidly and effectively as possible.

Fire plows have existed for many years and are generally comprised of a main frame, supported for transport by an axle and at least one pair of wheels mounted in a support frame. This axle is connected to the plow's main frame by some type of height adjustment arrangement, such as a hydraulic cylinder with the height being adjusted either by moving the plow frame relative to the support frame and wheel axle or by swinging the axle to lower the support frame. The plow main frame also generally supports a rolling coulter blade, a middle buster plow, a pair of discs and a spreader bar welded at the tail end of the plow frame. These fireline plows have been very large and wide and had to be pulled by large tractors. Further, the discs were mounted outboard of and not directly on the main frame. This was necessary to be properly positioned outside of the middle buster plow and to develop the wide trench. Also, the rolling coulter blade would be mounted in a fixed position, relative to the main frame, and was not adjustable.

Fireline plows, as well as tractor hitches have existed in the art. One example of the combination is set forth in Brazell, U.S. Pat. No. 3,731,750. Brazell discloses primarily a hitch attachment which can affect the raising and lowering of a fireline plow comprised of a rolling coulter followed by a plow blade and a disc unit, all of which are attached to the plow's main frame. The hitch employs a hydraulic cylinder for raising and lowering the plow and when raised, uses a pin on the pivoting portion to control the position of the hitch and plow and to hold the plow centered. During raising, the pin will initially move between two sloping caming surfaces. As the pin moves along one or the other of the sloped surfaces, the hitch and that attached plow will be centered. When fully raised, the pin will lie between two vertical faces which are spaced apart just wide enough to receive the pin. This holds the plow in a centered position and also limits horizontal sway of the hitch. If the pin should wear, break off or otherwise become misformed, both the centering and the retaining functions would not operate precisely as desired.

In addition, a series of holes are provided in the hitch frame together with a separate pin so that when the hitch is in its raised position, that separately stored pin can be placed through the holes provided therefor in the hitch to lock the pivoting portion and prevent downward rotation around a horizontal axis. This pin, however, can only be inserted by an operator standing next to the hitch and not from any position on the tractor. Likewise, to remove this pin requires the tractor operator to be next to the hitch frame. Thus, this locking function cannot be achieved either automatically or from the driver's position on the tractor.

Noblin, U.S. Pat. No. 2,990,632, discloses a fire plow attachment for tractors. It is mounted ahead of the tractor and employs a forward nose section that has plowlike side plates for moving debris to opposite sides of the path and to lift logs and other debris out of the way. There then follows a coulter blade mounted in the center of a rolling drum and that is in turn followed by a clearing plow blade for scraping the surface of the ground that has just been rolled. The coulter is provided to cut small debris in advance of the rolling drum and material that cannot be cut by that coulter will cause the coulter to raise up over the debris simultaneously raising the following scraping plow blade to prevent it from engaging such debris. Noblin states that the purpose of his rolling drum is to regulate the height of the scraping or clearing plow.

Pendergast, U.S. Pat. No. 1,491,168 and Flynn, U.S. Pat. No. 2,582,538, relate to trenching machines for forming trenches, but do not contain or suggest the particular plow structures set forth herein. Reference can also be made to other patents which show various types of plows including Horner, U.S. Pat. No. 709,601, Domries, U.S. Pat. No. 2,852,995, Mikhailov et al, U.S. Pat. No. 3,510,970, Heiberg, U.S. Pat. No. 3,571,956, Jackson, U.S. Pat. No. 3,586,111, and Ruozi, U.S. Pat. No. 4,015,667.

In addition, Vink, U.S. Pat. No. 4,026,225, shows a machine for planting trees and shrubs and employs an initial cutting or ground loosening device provided with teeth which is followed by a pair of discs which further loosen the soil in the trench area. The discs are followed by a two sided trench coulter for digging the trench itself. This is followed by a tree planting section and finally by plates which return the soil originally dug from the trench back into the trench and around the trees being planted. Finally, Nja, U.S. Pat. No. 3,486,566, discloses a tractor plow that includes a stone release mechanism with the plow being pivotally mounted so that it can swing upwardly against the counter action of an overcenter spring mechanism. A compression spring surrounds each of a pair of parallel spaced rods, the springs being compressed by the upward pivoting as might be caused when an obstacle in the ground is struck by the plow. The increasing downwardly directed compressed spring force will endeavor to bring the plow back to its correct working position with the springs asserting approximately no force while the plow is in its normal working position.

With respect to the locking concept, attention is also directed to Bernotas et al, U.S. Pat. No. 3,527,308 which shows additional use of a pin and lever arrangement for holding a hitch assembly in a raised transport position. Anti-sway mechanisms can also be found in Wier et al, U.S. Pat. No. 3,047,076, Mellen, U.S. Pat. No. 3,107,736 and Van Der Lely, U.S. Pat. No. 3,223,177.

Andersen, U.S. Pat. No. 4,316,511, discloses the use of two latch members, one for holding pivoting arms on harrows or mowing machines in their raised transport position and in their lowered working position. Other forms of locking arrangements are also shown in Ruddock, U.S. Pat. No. 2,362,407, Jones, U.S. Pat. No. 3,274,712 and Orthman, U.S. Pat. No. 4,074,766.

SUMMARY OF THE PRESENT INVENTION

The locking hitch attachment, according to the present invention, includes a hydraulic raising and lowering assembly, an implement attaching main frame, a swivel hitch assembly directly mounted to the rear of the tractor, a locking stabilizer assembly and locking means for locking the stabilizer assembly and, in turn, the main frame. The locking stabilizer preferably includes a pair of support arms fixed to the main frame so as to define a free end directed forwardly toward the tractor with hooks on the free end that will cooperate with a locking pin which is operable from the driver's seat. The stabilizer assembly also includes a locking stabilizer plate that will fit flush against a cooperating plate member, fixed to the main hitch assembly, when in the locked or transport position. The locking stabilizer plate is in the form of a flat plate which will directly engage a similarly flat bump plate, which forms part of the main hitch assembly, so that when in its locked condition, the entire hitch assembly and any implement connected to it will not be horizontally shiftable or pivotal from side to side.

The improved fireline plow device, according to the present invention, includes a main frame which serves to support a front rolling coulter assembly, followed by trench expanding middle buster point assembly which, in turn, is followed by a dual disc assembly. Mounted behind and about at the midpoint of the dual disc assembly are outrigged spreader wings for spreading the dirt rows developed by the discs and for finishing the tops thereof.

As with other fireline plows, the rolling coulter serves to initially engage the soil and develop the initial rolling cut therein as well as the cutting of small debris. The middle buster assembly positioned therebehind will further wedge open the rolling cut developed by the coulter assembly. The dual disc's position behind the middle buster assembly will then penetrate further into the thus opened wedge and roll the soil to either side to develop a high crested line of soil. At this point, the outrigged spreader wings will then top or flatten the upper portion of the line of soil rolled by the discs yielding a path from which vegetation and burnable material has either been removed or covered over so that only a swath of bare soil remains exposed. The depth to which the plow will reach is controlled by a separate depth adjustment assembly provided at the rear of the plow.

Unlike the prior known versions, the rolling coulter blade is adjustably mounted by a pair of adjustable mounting arms, so that the positioning of the coulter blade can be changed to accommodate changing conditions and blade wear.

Also, to establish a narrower fireline, the main frame includes a modified middle buster foot the shape of which allows the middle buster blade to be reduced in size and mounted directly to the front and provides for the direct mounting of the disc box or mounting hub thereto. This reduces the width of the unit and allows the entire plow to be lighter and narrower. The spreader bar is also mounted directly to the middle buster foot with the height adjustment mechanism also extending through that area.

Other objects, features, and characteristics of the present invention as well as the methods and operation and functions of the related elements of the structure, and to the combination of parts and economies of their manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS OF THE PRESENT INVENTION

Figure 1:
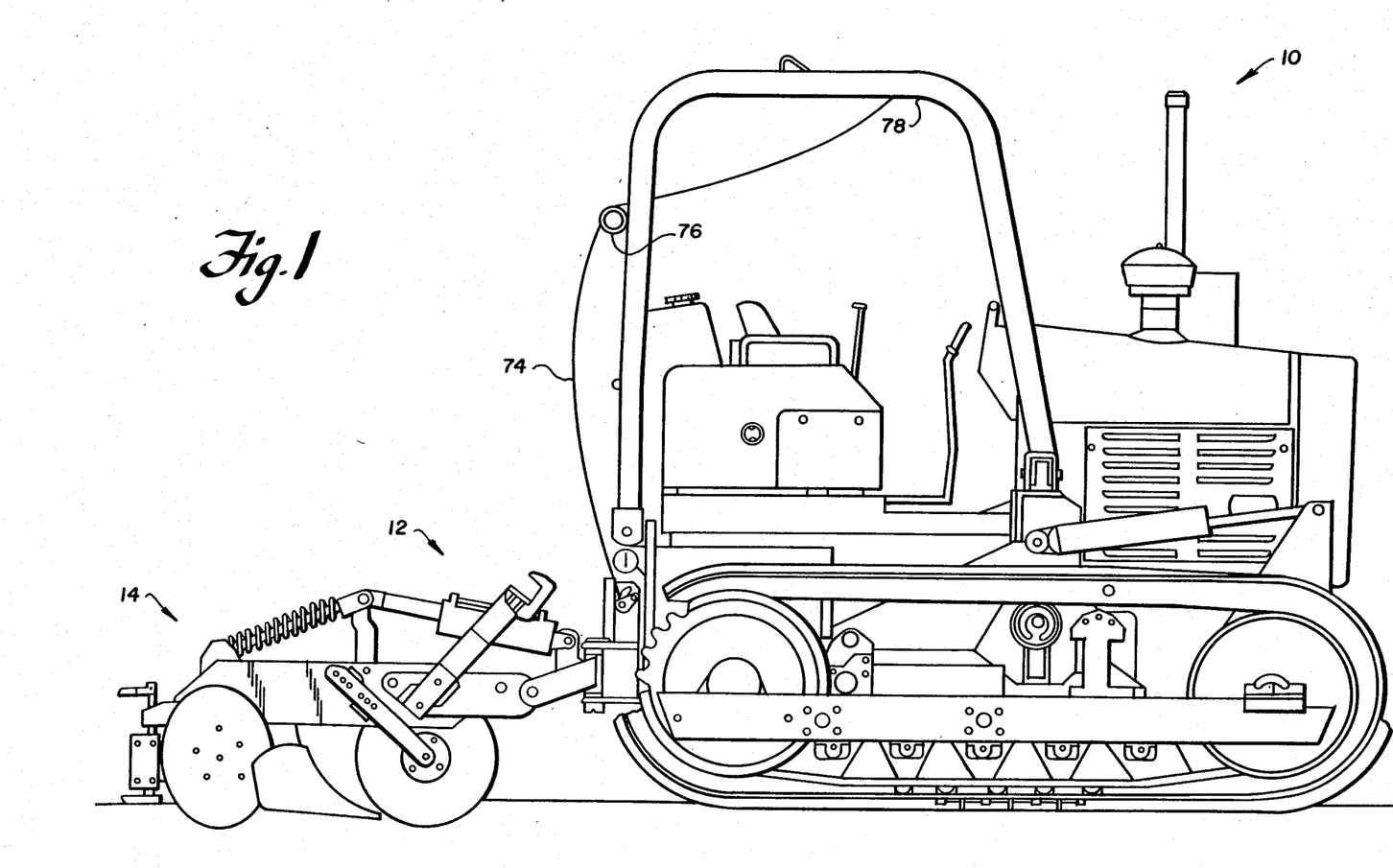
FIG. 1 is a diagrammatic, side elevational view of a crawler type tractor, together with hitch and fireline plow attachments according to the present invention, wherein the hitch assembly is unlocked and the plow is in a plowing position.

With reference first to FIG. 1, a smaller and narrower conventional crawler type tractor is shown generally at 10 together with the hitch assembly according to the present invention, being generally indicated at 12, and the fireline plow assembly according to the present invention, being generally indicated at 14.

THE HITCH ASSEMBLY

With reference now specifically to FIG. 2–5, the tractor includes a rear frame plate 16 to which base plate 18 of hitch assembly 12 is directly attached by bolts or other suitable means that will securely hold the hitch assembly in place yet permit its removal. The intent is that such attachment would allow the hitch assembly to be removed from the tractor so that welding or other permanent attachment technique would not be employed.

Base plate 18 has welded to it a swivel base, generally indicated at 20, which is comprised of lower and upper horizontal plates 24 and 26 welded at least along one edge to base plate 18. Numeral 22 designates a hollow area therebetween to permit swivelling as will become evident hereafter. Similarly, a pair of vertical plates 28 are welded along a bottom edge to the top of horizontal plate 26 and along a front vertical edge to base plate 18. A separate bump plate 30 spans across the rear vertical edges of vertical plates 28 and is similarly welded thereto and to the top of plate 26. This is perhaps best seen in the top plan view in FIG. 4. Bump plate 30 is also provided with a pair of openings 31 and 33, the purpose of which is explained below. Horizontal plates 24 and 26 extend outwardly in front of a vertical plane established by bump plate 30 and each are provided with an aperture in which a vertically mounted swivel pin 32 is secured. This swivel pin 32 thereby defines the main vertical pivoting axis about which hitch assembly 12 and, of course, any plow attached thereto can pivot when the hitch is in its unlocked position. It is also about that vertical axis that no horizontal pivoting or motion is desired once the hitch assembly 12 is locked in its transport position.

A mounting collar 34 is rotatably mounted about swivel pin 32 and a pair of swivel arms 36 and 38 have one end welded to the side of collar 34. Thus, arms 36 and 38 and collar 34 form an integral unit.

Figure 5:
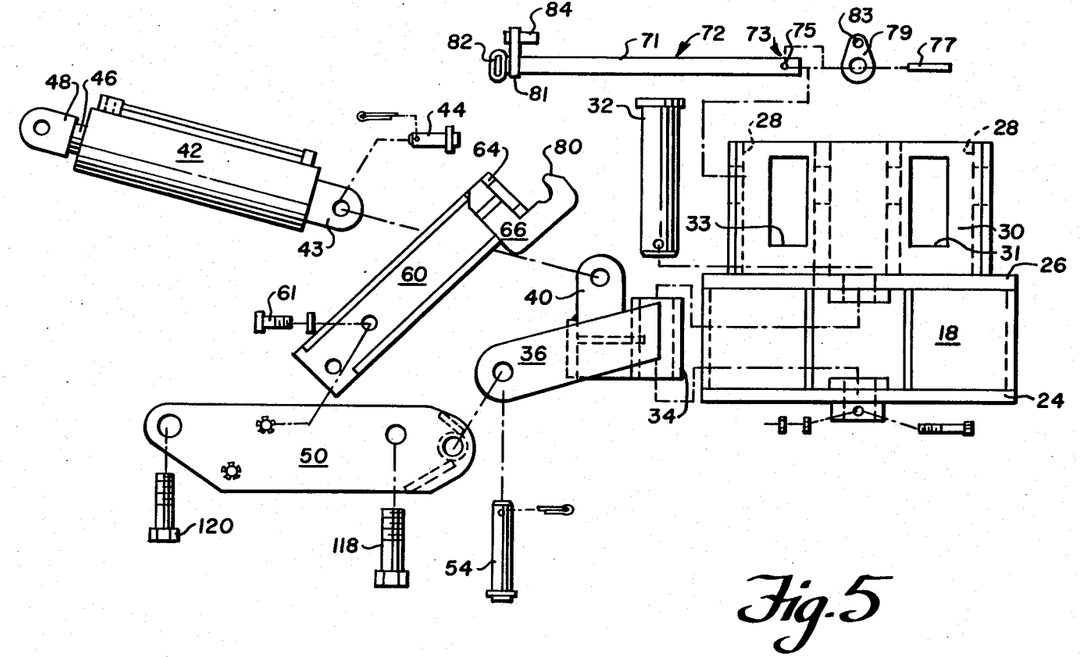
FIG. 5 is an exploded, side, elevational view of the hitch assembly of the present invention with the mounting plate being shown in front plan for clarity.
Figure 6:
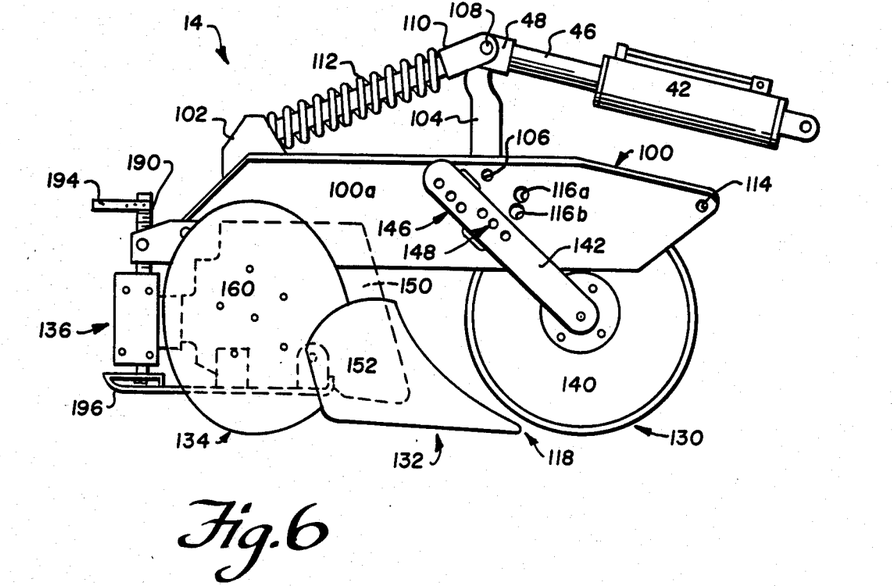
FIG. 6 is an enlarged side, elevational view of the plow attachment as shown in FIG. 1.

A vertically extended mounting arm 40 for supporting one end of the main actuating cylinder 42 is welded to the front of mounting collar 34 and to the inside surfaces of arms 36 and 38 adjacent collar 34, as shown in FIG. 5. Actuating cylinder 42 preferably has a 4 inch diameter, a 12 inch stroke, and a mounting lug 43 is attached to arm 40 by means of pin 44. Cylinder 42 is in turn is provided with a drive ram 46 provided at the end with a clevis member 48.

A pair of plow hitch arms 50 and 52 are secured between the outer ends of swivel arms 36 and 38 by pin 54. Pin 54 also defines the horizontal pivoting axis for plow hitch arms 50 and 52 relative to arms 36 and 38.

Plow hitch arms 50 and 52, respectively, each support a locking stabilizer arm 60 and 62, with each stabilizer arm having one end fixed to its plow hitch arm by bolts 61 or by welding so that each of the stabilizer arms 60, 62 extend forwardly toward the tractor from hitch arms 50 and 52. The opposite end of stabilizer arms 60 and 62 are connected together by means of a locking stabilizer plate 64 which is preferably welded to those outer ends of arms 60 and 62. Also, a pair of locking hooks 66 and 68 are welded, respectively, to stabilizer arms 60 and 62 and also to the locking stabilizer plate as shown in FIGS. 3–5 so that the open part of hooks 66 and 68 extends outwardly away from and opens upwardly beyond the exposed face of stabilizer plate 64 and the ends of locking stabilizer arms 60, 62.

Figure 3:
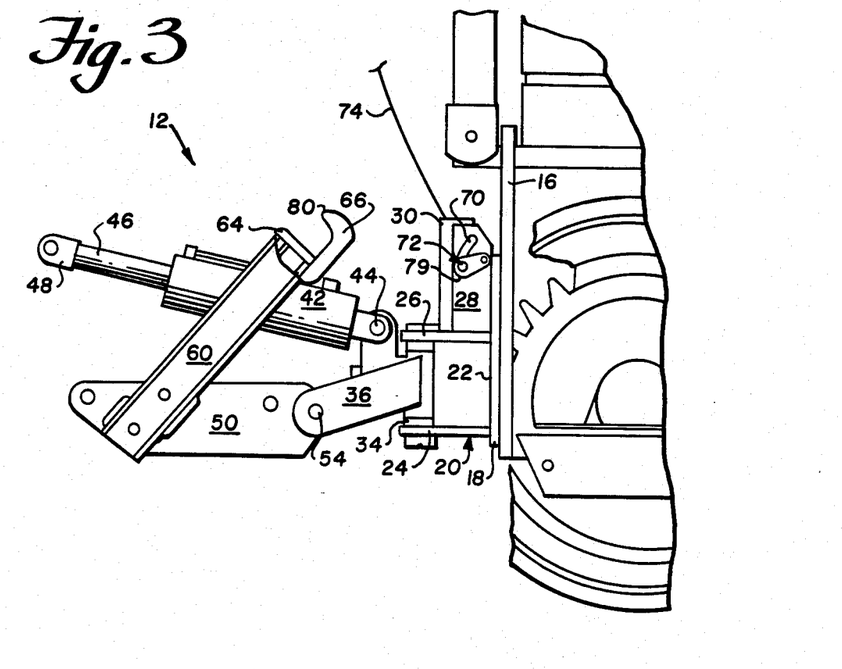
FIG. 3 is a partial, side elevational view of the hitch apparatus shown in FIG. 1 from which portions have been omitted for clarity.
Figure 4:
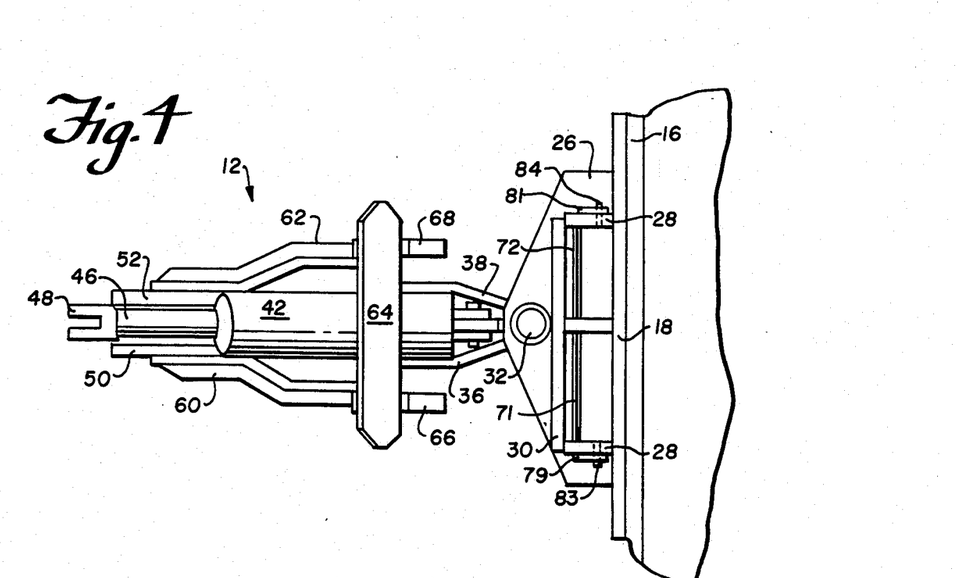
FIG. 4 is a top, plan view of the apparatus shown in FIG. 3.

Vertical plates 28 are provided with curved slots, as best shown at 70 in FIG. 3. A locking bar unit, generally indicated at 72, operates within slots 70 and its structure is best shown in FIG. 5. Bar unit 72 is comprised of a bar 71 that extends across plates 28. One end 73 is provided with an aperture 75 for receiving pin 77 which will hold an end plate 79 in place. Another end plate 81 is fixed to the other end of bar 71 together with a cable connection, 82. End plates 79 and 81 each include a pivot pin 83 and 84, respectively, that will fit within an aperture 85 provided in plates 28 adjacent slots 70. Bar 71 can be installed from either side of the hitch and end 73 will be slid through both slots 70 in plates 28 and pin 84 in end plate 81 will be fit into aperture 85. End 73 will then extend outwardly beyond the opposite plate 28 and end plate 79 can be mounted in place thereover and so that its pin 83 will fit within its associated aperture 85. After mounting, bar 71 will move within slots 70 and about the pivot axis defined by pins 83/84. When bar 71 is pivoted up and is positioned at the top of slots 70, bar 71 will lie above hooks 66, 68 so that the latter can pass through openings 31, 33 in bump plate 30 and will clear bar 71 and pass therebeneath. When bar 72 is pivoted downwardly and is positioned adjacent the bottom of slots 70, it will lie within the open portion of hooks 66, 68, locking the latter in place.

An operating cable 74 is connected to and passes over a pulley 76 to a fixed position as indicated at 78 so that a portion of cable 74 passes directly above the operator and across the cab of the tractor. By pulling down on that portion of cable 74 lying between pulley 76 and the fixed position 78, the operator can pivot locking bar 71 raising it to thereby unlocking the hitch assembly or assist in the locking procedure.

It should also be noted that the outermost portion of hooks 66 and 68 are provided with a beveled portion 80.

Thus, as cylinder 42 raises the device attached to it, locking stabilizer arms 60, 62, which are fixed to arms 50, 52, will move in an arc with hooks 66, 68 and stabilizing plate 64 moving forwardly toward bump plate 30, openings 31, 33, and bar 72. As hooks 66, 68 pass through openings 31, 33, the beveled surface 80 will contact and raise locking bar 71. Once the front portion of hooks 66, 68 pass beyond locking bar 71, the locking bar will fall into place at the bottom of slot 70 and lock hooks 66 and 68 into the locked position shown in FIG. 2. As hooks 66 and 68 move into their locked position, the front face of stabilizing plate 64 will come into engagement with the exposed rearward face of bump plate 30 with that engagement preventing the horizontal swaying of the hitch assembly when in its locked condition.

THE PLOW ASSEMBLY

Turning our attention now to FIGS. 2 and 6-9, the fireline plow assembly, generally indicated at 14, includes a main support frame 100 in the form of two plate members 100a, 100b which are welded together to form a box frame. Plates 100a, b are about 6" high and $\frac{3}{8}$" thick and when welded together, the frame 100 is about 3.5" wide. To the top rear is mounted a rear recoil spring mount 102 while a trunion member 104 is attached by means of bolt 106 to frame 100. The rear recoil spring mount 102 is preferably welded to frame 100. The opposite end of trunion 104 is connected by means of pin 108 to clevis 48 of cylinder 42 and also to one end of spring rod 110. The opposite end of spring rod 110 slides through the rear recoil spring mount 102 and its withdrawal from that mount is prevented by means of a suitable washer and nut 111 shown in FIG. 8. Mounted between the forward face of recoil spring mount 102 and a shoulder 113 on the forward end of spring rod 110 is compression spring 112.

Figure 2:
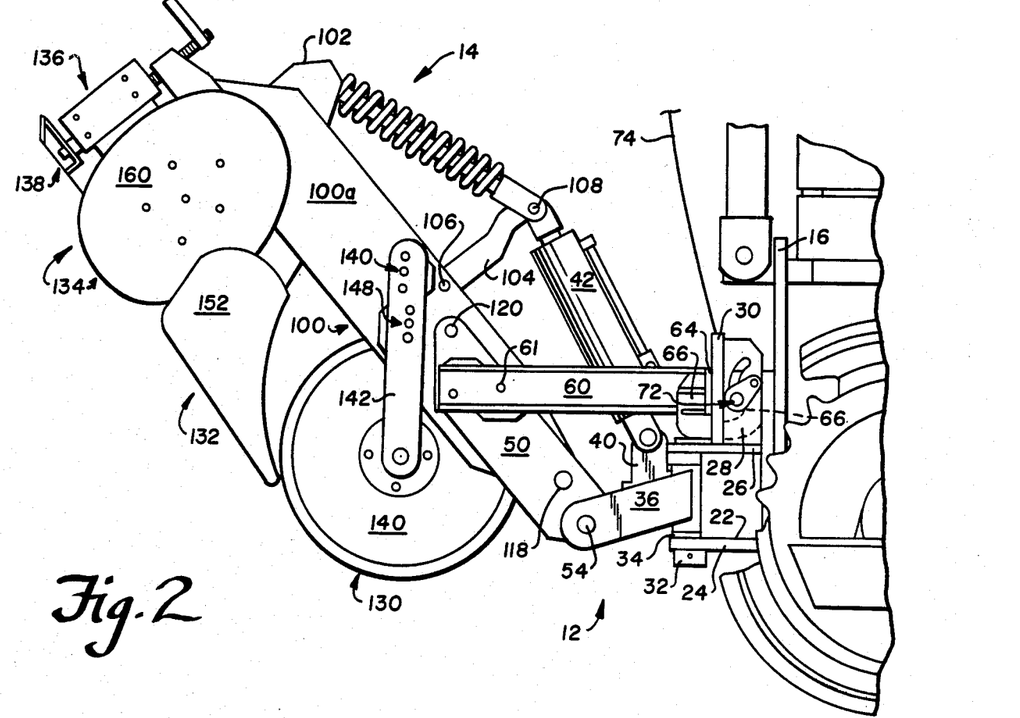
FIG. 2 is a partial, side, elevational view of the apparatus shown in FIG. 1 but with the hitch in its locked position and the plow in its raised or transport position.

The forward end of plow assembly frame 100 is provided with an aperture 114 and a pair of apertures 116a and 116b, separated from one another by about one inch with 116b being below and slightly rearward of 116a. Aperture 114 and one of the pair of apertures 116a, 116b are then used to bolt the plow assembly 14 to plow hitch arms 50 and 52 by means of bolts 118 and 120, respectively, as shown in FIGS. 2 and 5. The top hole 116a is used to properly orient the plow 14 when the soil is dry or hard. The lower aperture 116b is used to orient the plow 14 when the soil is wet or soft. Thus, these adjustment holes 116a and 116b can be advantageously used to better position the plow or implement in accordance with ground conditions making plowing and the results therefrom more successful.

The bottom and working portion of plow 14 includes the four usual fire plow subassemblies beginning with a rolling coulter assembly 130, a middle buster assembly 132, a disc assembly 134, a spreader assembly 136, and a height adjustment assembly 138.

However, coulter assembly 130 is adjustable relative to frame 100 and is comprised of a rolling coulter blade 140 which is adjustably mounted to frame 100 by means of a pair of coulter arms 142 and 144 by bolts 145. Each of the coulter arms is provided with two groups of a plurality of mounting apertures the upper group generally indicated at 146 and the lower group generally indicated at 148. These apertures are provided so that the coulter blade 140 can have its position adjusted relative to the frame and relative to the degree of ground engagement desired. They also provide adjustment to accommodate coulter blade wear. Further, they allow the coulter blade to be properly angled and positioned relative to the middle buster assembly 132.

Figure 7:
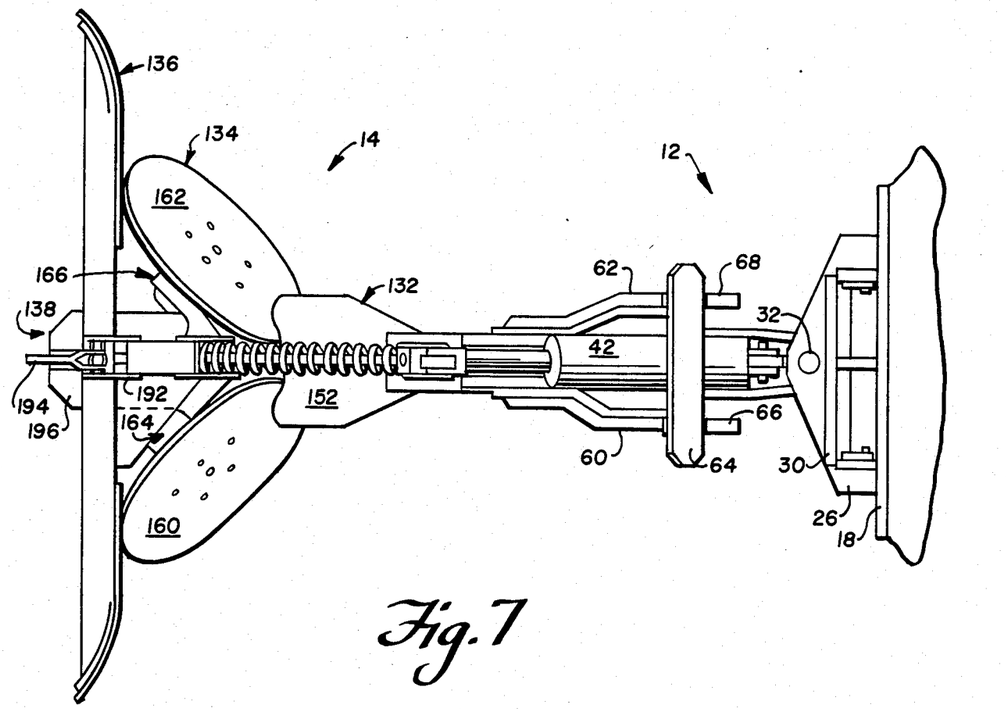
FIG. 7 is a top, plan view of the hitch and plow apparatus as shown in FIG. 1 where the hitch is in its unlocked position.
Figure 8:
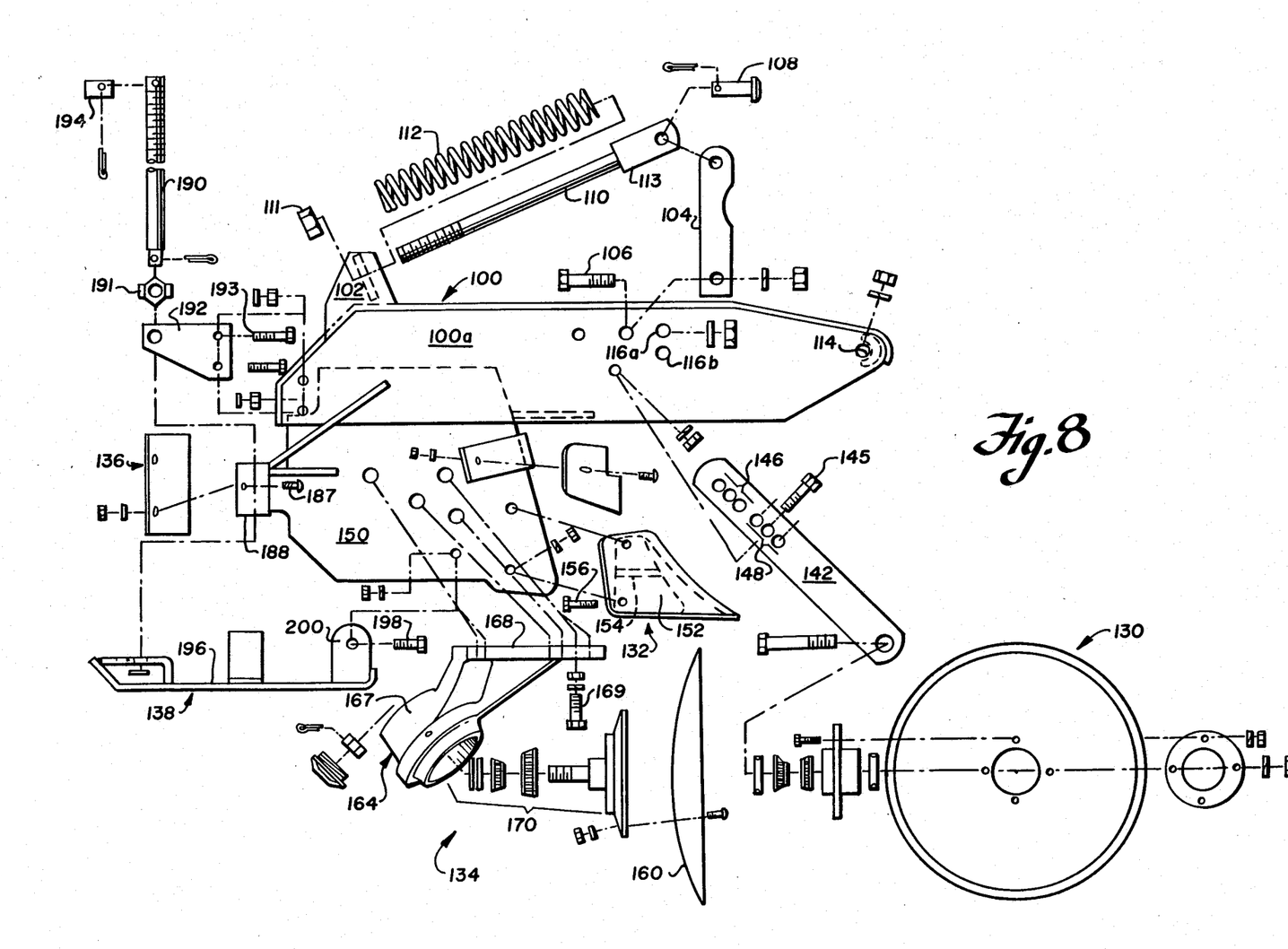
FIG. 8 is an exploded, side elevational view of the plow apparatus shown in FIG. 6.
Figure 9:
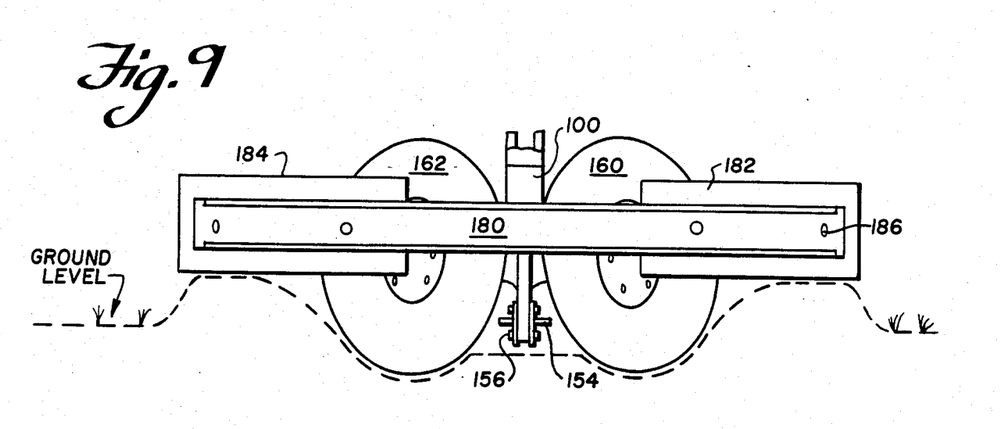
FIG. 9 is a diagrammatic, rear elevational view of the plow, according to the present invention as it proceeds in its plowing position through soil to develop a fireline.

Middle buster assembly 132 is comprised of a middle buster foot 150 welded inside frame 100 so that it depends below and along that frame. A narrow middle buster blade 152 is mounted to the front face of foot 150 with such mounting being accomplished by use of mounting flanges 154 integrally formed in the rear cavity thereof and bolts 156 as shown in FIGS. 7, 8 and 9.

Disc assembly 134 is comprised of a pair of rotatable discs 160 and 162, either 20 or 26" in diameter, which are mounted to frame 100 via disc boxes generally shown at 164 and 166. Because middle buster blade 152 is narrower, discs 160, 162 can be brought inboard. Disc boxes 164, 166 are comprised of a hub portion 167 from which an integrally cast mounting flange 168 extends. Mounting flange 168 is directly bolted to foot 150 by bolts 169 thereby reducing the width of plow 14 a further extent. Discs 160, 162 are rotatably mounted in the respective hub portions 167 by the mounting unit shown at 170. Discs 160 and 162 are angled at approximately 45° angle with respect to the longitudinal axis of frame 100 and are able to freely rotate.

Spreader assembly 136 is comprised of a channel shaped mounting bar 180 which extends across the width of the plow. Spreader wings, in the form of plates 182 and 184, are mounted to bar 180 such as by bolts 186 and mounting bar 180 is itself fixed to frame 100 as, for example, by being bolted through bolts 187 to a mounting flange 188 extending rearwardly from the rear of foot 150.

The height adjustment assembly 138 is comprised of an adjustment screw 190 which threadedly engages a socket 191 mounted in a bracket 192 bolted to frame 100 by bolts 193. Control over adjustment is provided by turning screw 190 within socket 191 by handle 194. Rotatably attached to the bottom end of screw 190 is one end of a slide shoe 196 with the other end of shoe 196 being bolted to the bottom of foot 150 by bolt 198 and a mounting bracket 200 at the forward end of shoe 196. The forward bottom surface of shoe 196 is curved so that it can engage and slide along the ground thereby orienting the coulter, middle buster, disc and spreader wing assemblies relative to the ground. By this adjustment technique, operation of the hitch and plow assembly will occur as follows.

With the hitch and plow assembly initially as shown in FIG. 2, with the hitch in its locked position, thus keeping the plow assembly 14 in its transport position. In this mode, locking stabilizer plate 64 will be held directly against bump plate 30 by means of the relative position of locking hooks 66 and 68 and locking bar 72. Initially, the hydraulic cylinder 42 can be actuated to slightly pull the plow assembly further toward its transport position so as to relieve any pressure between locking hooks 66 and 68 and locking bar 71. The operator, from his position on the seat of the tractor, or within the cab of that tractor can then actuate cable 74, pulling the locking bar upwardly along curved slot 70. This will release hooks 66 and 68 from their locked position. By then actuating cylinder 42 in the opposite direction, hitch arms 50 and 52 and plow 14 can be pivoted about horizontal axis 54 down to the operating position as shown in FIG. 1.

As the tractor 10 begins forward motion, the coulter, middle buster and disc assemblies will be drawn into the earth with the depth of their insertion being controlled by depth slide 196. The coulter blade 140 will provide an initial rolling cut in the soil and will provide a path in which the middle buster will be inserted. The middle buster itself, will engage the earth and cause the ground to be wedged open a further amount across its plow surfaces. Discs 160 and 162 will then engage the soil that is wedged open by blade 152 and by their rotation will further cut and roll the soil further to the outside along the plowing path. The soil will be mounded up and the top portion of the soil that has been cut and rolled to the side will be engaged by the spreader wing plates 182 and 184 which will further spread the soil out and push it over forming the outer boundaries on each side of the fireline. The resulting area will have a cross-section essentially as shown in FIG. 9 with that area being cleared of all brush and vegetation or covered over with soil so that it will not be exposed to any flames of the forest fire. It should be understood that other devices for moving bar 71, such as a cylinder or motor driven linkage operated from the operator's seat, could be used in place of cable 74.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the sprit and scope of the appended claims, which scope is to be accorded the broadest interpretation so as to encompass all such modifications and equivalent structures.

What I claim is:

1. A hitch assembly attached to a tractor for use in mounting implements behind the tractor said hitch assembly being movable between a raised locked position and a lowered operating position, said hitch assembly comprising:

mounting means for mounting the hitch assembly to the tractor, said mounting means including a mounting and swivel means for providing a vertical swivel axis about which said hitch assembly can pivot, at least one connection arm mounted to said swivel means so as to be laterally pivotable about said vertical swivel axis and extending rearwardly therefrom, at least one stabilizing bar having two ends, one of said ends being fixed to said at least one connection arm and extending forward therefrom, a stabilizing plate member having a flat front face fixed to the other of said two ends and positioned so as to extend laterally across said hitch assembly, locking means for locking said hitch assembly in said raised locked position, said locking means including at least one locking member fixed to said other end of said stabilizer bar so that said locking member extends beyond said flat front face of said stabilizing plate member and locking bar means mounted on said mounting means and movable between raised unlocking position and a lowered locking position wherein said bar means retains said at least one locking member securing said hitch assembly in said raised locked position, and means for moving said locking bar means between its raised and lowered positions from on board said tractor, a bump plate having a flat exposed face mounted to said mounting plate so as to be positioned rearward of said locking bar means with said exposed face extending laterally across said hitch assembly, said bump plate also including means defining at least one opening for receiving said at least one hook member therein, and drive means for operating said hitch assembly between its raised and lowered positions so that when in the raised position, the front face of said stabilizing plate member will engage said exposed face of said bump plate thereby preventing horizontal swaying of said hitch assembly when locked.

2. A hitch assembly as in claim 1, wherein said mounting means includes a vertically extending mounting plate and means for removably attaching said mounting plate to said tractor.

3. A hitch assembly as in claim 2, wherein said swivel means includes spaced apart upper and lower plate members welded to the rear side of said mounting plate, each of said upper and lower plate members including means defining an axially aligned aperture, a swivel pin mounted within said apertures, and a tubular collar member pivotally mounted about said swivel pin wherein said at least one connection arm is mounted to said tubular collar member.

4. A hitch assembly as in claim 1, wherein said locking bar means includes a locking bar assembly comprised of a bar having two ends, an end plate fixed to one end, a second end plate removably attached to the other end, each of said end plates including a pin extending axially inwardly, connection means adjacent said one end for connecting said bar to said mounting means.

5. A hitch assembly as in claim 4, wherein said locking bar means further includes plate means rigidly mounted to and between said bump plate and said mounting means for defining an opening between said bump plate and said mounting means for operatively receiving said locking bar.

6. A hitch assembly as in claim 5, wherein said plate means comprises a pair of horizontally spaced apart plates, each including first means defining an arcuate slot that curves upwardly and away from said bump plate and second means defining an aperture positioned uniformly radially inwardly from said curved slot so that when said bar is mounted between said plates, the bar will pass within said slot and said pin is positioned within said aperture so that as said bar is moved, it pivots about an axis defined by said pins.

7. A hitch assembly as in claim 1, wherein a pair of stabilizing bars are fixed to opposite sides of said at least one connection arm with said stabilizing plate extending across said pair of stabilizing bars and wherein each of said stabilizing bars includes a locking member, said hitch assembly further including means defining a pair of openings in said bump plate for receiving the locking members therethrough.

8. A hitch assembly connecting an implement to the rear of a tractor and movable between a raised transport position and a lowered working position, said hitch assembly comprising a mounting assembly extending laterally across the rear of the tractor for mounting said hitch assembly to said tractor, said mounting assembly including a first elongated flat plate member extending laterally across a major portion of said mounting assembly, said mounting assembly further including a pair of spaced apart implement connection arms fixed in spaced apart relationship to said implement and pivotally attached to said mounting means so as to be movable horizontally when said hitch assembly is in said lowered working position and vertically pivotal between said raised and lowered positions, a pair of stabilizing arms each fixedly connected to a respective connection arm and extending forward therefrom, a second elongated plate member having a length substantially equal to the length of said first elongated flat plate member and being fixed to said stabilizing arms so as to at least extend therebetween and be movable therewith, locking means including at least one opening extending through said first elongated plate member, at least one hook member fixedly attached to a front face of said second elongated plate member, and a locking member attached to said mounting means forward of said first elongated plate, wherein when said hitch assembly is in its raised transport position, said at least hook member extends through said at least one opening, said first and second elongated plate members abut each other, and said locking member engages said hook member so that said hitch assembly is locked in said raised transport position and prevented from horizontal movement.

* * * * *